United States Patent [19]

Hundstad

[11] 4,152,672
[45] May 1, 1979

[54] TECHNIQUE FOR MINIMIZING ARC CONDITIONS IN A FLOWING GAS LASER SYSTEM

[75] Inventor: Richard L. Hundstad, Wilkinsburg, Pa.

[73] Assignee: Westinghouse Electric Corp., Pittsburgh, Pa.

[21] Appl. No.: 732,637

[22] Filed: Oct. 15, 1976

[51] Int. Cl.² .............................................. H01S 3/02
[52] U.S. Cl. .......................... 331/94.5 T; 331/94.5 D
[58] Field of Search ................. 331/94.5 G, 94.5 PE, 331/94.5 D; 330/4.3 T (U.S. only)

[56] References Cited

U.S. PATENT DOCUMENTS 3,842,366 10/1974 Gordon et al. ............... 331/94.5 PE
3,995,189 11/1976 Haslund .......................... 331/94.5 G

OTHER PUBLICATIONS

Crocker et al., Electronics Letters, vol. 8, No. 18, Sep. 7, 1972, pp. 460–461.

Primary Examiner—William L. Sikes
Attorney, Agent, or Firm—M. P. Lynch

[57] ABSTRACT

Described herein is a technique for removing gas constituents residing in the aerodynamic boundary-layer developed along the surfaces of electrodes in a flowing gas laser system, which gas constituents contribute to adverse arc conditions.

13 Claims, 6 Drawing Figures

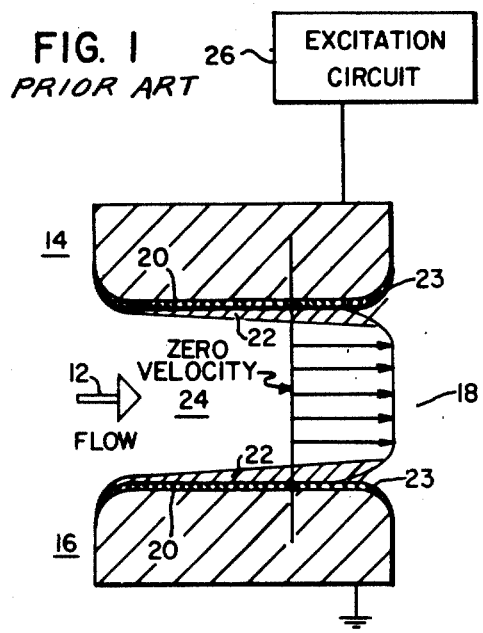
FIG. 1 PRIOR ART
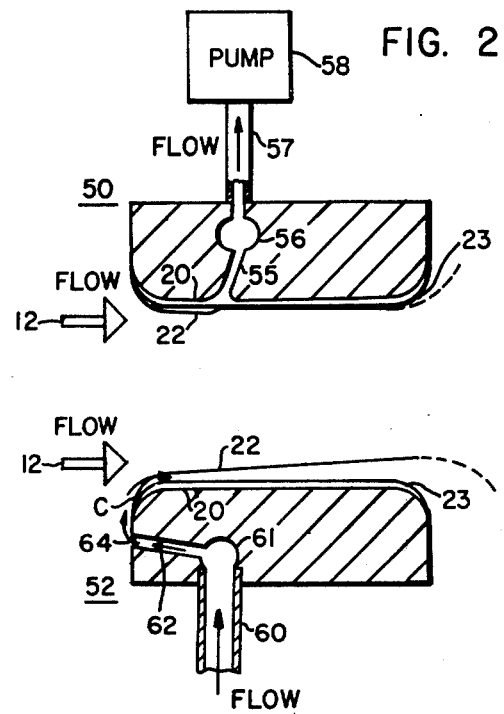
FIG. 2
FIG. 3
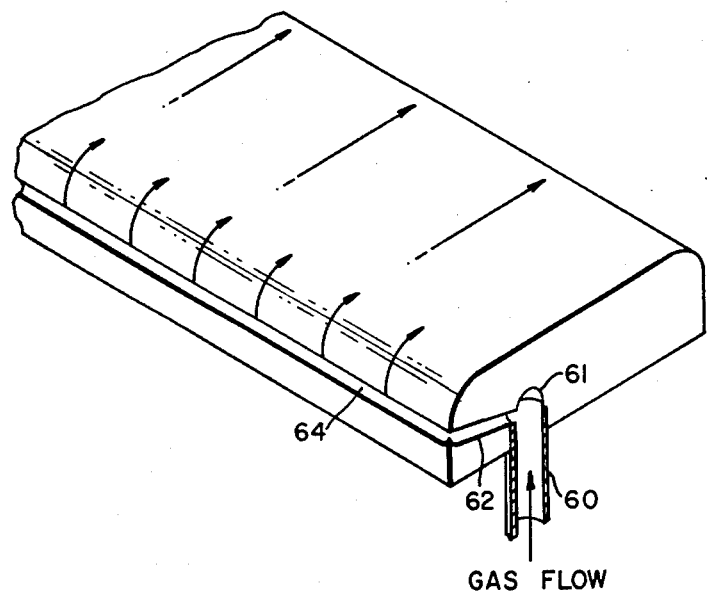
FIG. 4

TECHNIQUE FOR MINIMIZING ARC CONDITIONS IN A FLOWING GAS LASER SYSTEM

BACKGROUND OF THE INVENTION

1 Field of the Invention

This invention relates to a technique for increasing the output power from a flowing gas laser system, in particular for minimizing conditions which enhance glow-to-arc phenomena by removing undesired gas constituents which reside in a boundary layer which envelops the electrical sheath region along the electrode surfaces of a laser.

2 Description of the Prior Art

A flowing gas laser system, frequently referred to as a convection gas cooled laser, is designed such that the flowing medium passes through an electrode configuration, thereby carrying away the heat which is generated due to electrical discharge in the laser gas. The average optical power output of such a laser system is determined by the product of the energy per optical output pulse and the frequency of the optical output pulses. The average power output from the laser system may be significantly increased by maximizing the optical pulse repetition rate.

Attempts to increase the average power output of flowing gas laser systems have met with limited success. Experimental studies indicate that as the pulse repetition rate is increased, a threshold repetition rate is reached at which there will be a glow-to-arc transition, thereby limiting the maximum attainable pulse repetition rate. There are at least two primary factors which limit the maximum pulse repetition frequency of a given laser with a specific flow velocity through the cavity: (1) the optical homogeneity of the gases in the laser cavity, (2) the arcing properties of the gases in the cavity.

Optical homogeneity must be established in the laser cavity between succeeding laser pulses if it is desirous to obtain good beam quality, i.e., uniform, high power density. To obtain this uniform optical homogeneity in the cavity following a given laser pulse, sufficient time must be provided so that acoustical disturbances due to previous discharges and other disturbances will subside before the application of the succeeding pulse; therefore, the required clearing time for achieving or restoring optical homogeneity is an important factor in determining the maximum pulse repetition of a laser.

A second important factor is the time required to clear the residual gases in the aerodynamic boundary layer on the electrodes. Generally, these gases will be more prone to cause arcing rather than the desired glow discharge because of residual effects from the previous pulse, higher gas temperature, gas decomposition, and electron attachment. An arc may start almost immediately on the application of high voltage to the electrodes, or may result from a delayed glow-to-arc transition. The severity of the problem will determine the length of the glow period prior to the transition to an arc.

Attempts to minimize arcing conditions have included reducing localized regions of electric field enhancement at the electrode surfaces. Such regions alter the electric field established by the electrodes, thereby enhancing arcing conditions. Although such imperfections on the electrode surface have been removed, the residual effects from previous pulses still remain so as to limit the pulse repetition frequency.

SUMMARY OF THE INVENTION

The object of the present invention is to increase the pulse repetition rate of a flowing gas laser system, and thereby increase the power output by minimizing arcing between the electrode surfaces.

In accordance with the present invention, a technique is disclosed for minimizing arc conditions by removing undesired gas constitutents which reside in the aerodynamic boundary layer along the electrode surface.

The disclosed technique as described herein, can be satisfied by displacing the undesired gas constituents from the boundary layer near the electrode surface with a flowing gas, or drawing these gas constituents from the boundary layer near the electrode surface.

BRIEF DESCRIPTION OF THE DRAWINGS

FIG. 1 is a sectioned illustration of a standard electrode configuration and velocity profile of a flowing gas in a laser apparatus as constructed in the prior art;

FIG. 2 is a sectioned electrode configuration illustrating a technique for drawing the undesired gas constituents from the electrode surface;

FIG. 3 is a sectioned illustration of an electrode configuration whereby an auxiliary gas fills the boundary layer region, thereby removing the undesired gas constituents adjacent to the electrode surface;

FIG. 4 is a pictorial illustration of the embodiment of FIG. 3;

DESCRIPTION OF THE PREFERRED EMBODIMENT

Figure 5:
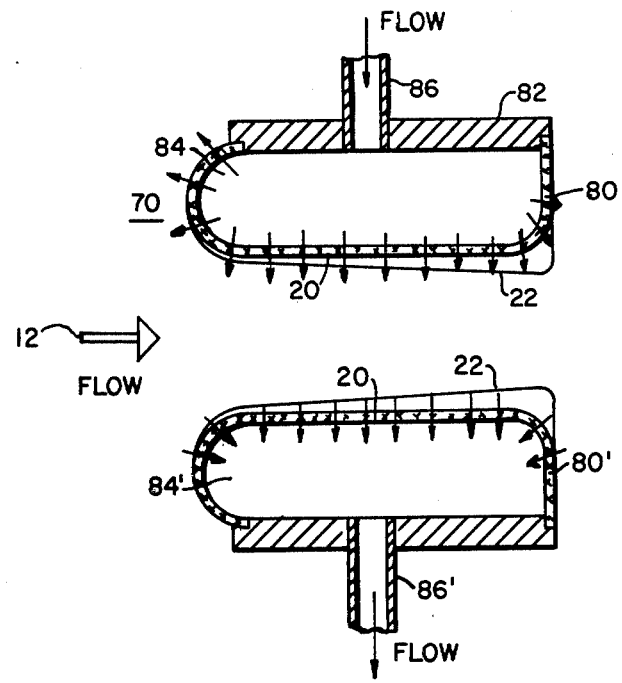
FIG. 5 illustrates an alternative electrode configuration suitable for use in the embodiments of FIGS. 2-4.

FIG. 1 illustrates a standard electrode configuration for a transverse flowing gas laser system with optical axis transverse to the flowing gas as constructed in the prior art. A gas 12 flowing between electrodes 14 and 16 establishes a vector velocity profile 18 whose magnitude diminishes on approaching the surfaces 20 of the electrodes 14 and 16. The magnitude of the velocity vector of the flowing gas 12 will diminish near the electrode surfaces 20 and approach zero at the surface due to frictional effects between the gas and the electrode surface 20. The reduced velocity region adjacent to the electrode surfaces 20 will in the remainder of the text be referred to as a boundary layer 22.

The boundary layer 22 envelops an electrical sheath 23 which is adjacent to the electrode surface 20. The electrical sheath 23 is characterized by higher electric fields than the remainder of the space between electrodes 14 and 16, and is influential in determining the onset of arcing. The electrical sheath 23 is a known, inherent electrode surface condition in laser apparatus.

Undesirable products, i.e., gas constituents, which may enhance adverse arc conditions, reside within the boundary layer 22 and require longer times before flowing from the discharge region 24. Such products may be formed by the electrical discharge of the gas 12 between the electrodes 14 and 16 and may typically include decomposition products, positive and negative ions, products in metastable states, and higher temperature gases which more easily ionize. These adulterated species or products in the boundary layer have an adverse effect on the arcing properties of the gas. The instability of the electrical sheath 23 enveloped by the boundary layer 22 coupled with the electrical properties of the gas results in local imperfections or perturbations of the electric field and current distribution established between the electrodes 14 and 16 by the conventional excitation circuit 26. Such field imperfections and associated maldistribution of current have a tendency to grow and thereby result in a glow-to-arc transition.

FIG. 2 illustrates an embodiment of an electrode configuration for removing the undesirable gas constituents in the boundary layer at the electrode surface 20 of electrode 50. The undesirable gas constituents in the boundary layer 22 are removed from the surface 20 of the electrode 50 by drawing the boundary layer 22 into a channel 55 of the electrode 50 along a conduit 56 which extends the length of the electrode and through exhaust tube 57 via pump 58. After leaving the pump 58, the gas may be discharged to the atmosphere or reconstituted so that it can be reused.

Alternatively, as illustrated in FIGS. 3 and 4, the boundary layer 22 at the surface 20 of an electrode 52 may be filled with an auxiliary gas flowing through inlet pipe 60 along a conduit 61 which extends the length of the electrode, and through channel 62 in electrode 52 so as to establish a preferred auxiliary gas in the boundary layer, as illustrated by the arrows. Locating the opening 64 of channel 62 at the upstream end of the gas flow 12 will have the beneficial effect of establishing the preferred auxiliary gas within the boundary layer over the entire critical area of the electrode where arcing may occur, thereby reducing the tendency for arcing over the entire electrode, including the curved portion C of the electrode 52. Suitable auxiliary gases include hydrogen and the noble gases. Other ambient gases used in the laser gas mixture or the laser gas itself which have not been subjected to previous electrical discharges or have been reconstituted after such a discharge may be used. Gases exhibiting strong electro-negative characteristics would not be suitable.

An alternative electrode configuration suitable for supporting the boundary layer removal techniques of FIGS. 2–4 is illustrated in FIG. 5. An electrode configuration 70 is illustrated as consisting of a porous electrode membrane 80 connected to a support member 82 to form an internal cavity 84. A gas flow tube 86 provides the capability of flowing gas into the cavity 84 and through the electrode membrane 80 to blow the undesirable residual gas constituents in the boundary layer 22 from the surface 20 in accordance with the embodiment of FIG. 3. Alternatively, tube 86' can function in accordance with embodiment of FIG. 2 to draw the boundary layer 22 through the electrode membrane 80' and the cavity 84' to effect removal of the undesirable residual gas constituents.

Figure 6:
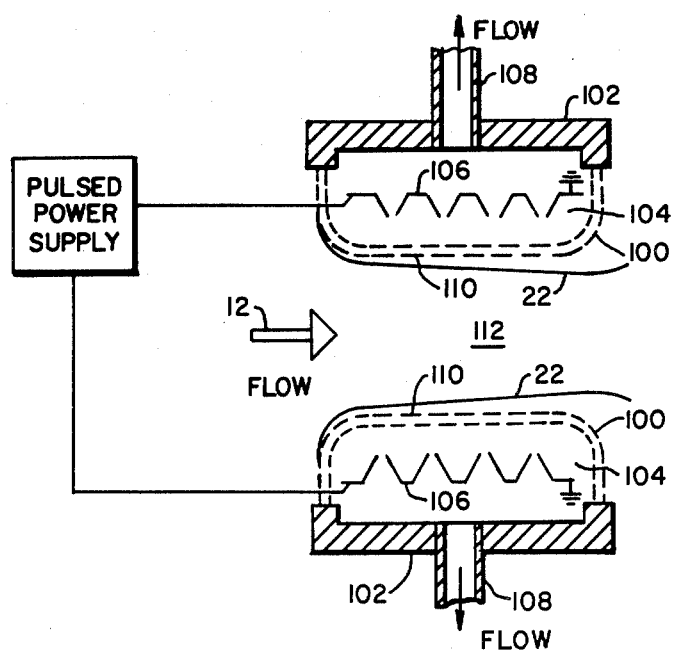
FIG. 6 illustrates an application of the inventive concept to an electrode configuration using ultraviolet initiation of electrons.

The inventive concept is also applicable to an electrode configuration using ultraviolet initiation of the glow discharge. FIG. 6 illustrates such an electrode configuration. A porous electrode membrane 100 is connected to a support member 102 to form an internal cavity 104. Ultraviolet sources 106 are within the cavity 104 and may be in one or both of the electrodes. Ultraviolet sources 106 are connected to pulsed power supply 107. A gas flow tube 108 provides the capability of removing the undesirable gas constituents in the boundary layer 22 from the electrode surface 110 by drawing the boundary layer 22 from the electrode surface 110 in accordance with the embodiment of FIG. 2. In this embodiment it is preferable that the flow be into the electrode cavity 104 to prevent gases which are adulterated by the spark discharges which produce the ultraviolet radiation from entering the laser cavity 112.

Those skilled in the art will appreciate that the inventive concepts and preferred embodiments discussed herein have application to any flowing gas laser system having electrode surfaces on which a boundary layer may reside. In such a system, eliminating these undesirable gas constituents which promote arcing results in the ability to achieve higher pulse repetition rates, and thereby increase the power output of the laser.

In laser systems operating with two or more electrodes, the embodiment of FIG. 3 or 5 of sweeping or blowing the undesired gas constituents from the discharge region with an auxiliary gas may be used on all electrodes. Alternatively, the embodiment of FIG. 2, 5, or 6 of drawing the undesired gas constituents from the electrode surface may be used on all electrodes. A combination of drawing the undesired gas constituents from one electrode surface and blowing or sweeping the undesired gas constituents with an auxiliary gas from the other electrode surface is also a feasible method of operation. However, in an electrode system using ultraviolet initiation, it is preferred that the boundary layer be drawn from the electrode surfaces so as to prevent gases adulterated by the spark discharges which produce ultraviolet radiation from entering the laser cavity.

While the embodiments chosen to illustrate the concept of substituting a preferred auxiliary gas in the boundary layer incorporate the auxiliary gas supply as an integral part of the electrode design, it is apparent that the same desired results can be achieved by introducing the auxiliary gas flow upstream and independent of the electrode structure.

I claim as my invention:

1. In a method for operating a laser system including a laser gas medium flowing through a discharge volume formed by spaced-apart electrodes, the flowing laser gas medium producing a boundary layer along at least one of said electrodes, and excitation means connected to said electrodes to produce electrical discharges to create a population inversion in said flowing laser gas medium to produce lasing action, a step for minimizing arcing in said discharge volume, said step comprising,
   removing gas constituents from said boundary layer exhibiting characteristics which support arcing conditions in said discharge volume.

2. A method according to claim 1 whereby said gas constituents are removed by flowing an auxiliary gas across the surface of said electrode to sweep gas constituents from said boundary layer.

3. A method according to claim 1 hereby said gas constituents are removed by drawing constituents from said boundary layer through said electrode.

4. A method as claimed in claim 1 wherein said electrode is porous, said gas constituents being removed by drawing said gas constituents from said boundary layer through said electrodes.

5. A method according to claim 1 wherein said electrode is porous, said gas constituents being removed by blowing said gas constituents from said boundary layer by blowing an auxiliary gas through said electrode surface.

6. In a laser system including a laser gas medium flowing through a discharge volume formed by a pair of spaced-apart electrodes, the flowing gas medium producing a boundary layer along at least one of said electrodes, and excitation means connected to said electrodes to produce electrical discharges to create a population inversion in said flowing laser gas medium to produce lasing action, the improvement for minimizing arcing conditions in said discharge volume, said improvement comprising, means for removing gas constituents present in a boundary layer along one of said electrodes which are responsible for initiating arc conditions in said discharge volume, including a source of auxiliary gas, and means for connecting said source of auxiliary gas to an aperture extending through said one of said electrodes to establish a flow of auxiliary gas through said aperture into said discharge volume, said aperture being disposed relative to the surface of said one of said electrodes to establish a sweeping flow of said auxiliary gas across the surface of said one of said electrodes to remove gas constituents present in a boundary layer associated with said one of said electrodes.

7. A means according to claim 6 wherein said auxiliary gas is selected from the group comprising the noble gases.

8. A means according to claim 6 wherein said auxiliary gas is hydrogen.

9. In a laser gas system including a laser gas medium flowing through a discharge volume formed by a pair of spaced-apart electrodes, the flowing laser gas medium producing a boundary layer along at least one of said electrodes, and excitation means connected to said electrodes to produce electrical discharges to create a population inversion in said flowing laser gas medium to produce lasing action, the improvement for minimizing arcing conditions in said discharge volume, said improvement comprising, means for removing gas constituents present in a boundary layer along one of said electrodes which are responsible for initiating arc condition in said discharge volume, including a pumping mechanism, and means for connecting said pumping mechanism to an aperture extending through said one of said electrodes to draw said gas constituents from said boundary layer through said aperture.

10. In a laser system including a laser gas medium flowing through a discharge volume formed by a pair of spaced-apart electrodes, the flowing laser gas medium producing a boundary layer along at least one of said electrodes, and excitation means connected to said electrodes to produce electrical discharges to create a population inversion in said flowing laser gas medium to produce lasing action, the improvement for minimizing arcing conditions in said discharge volume, said improvement comprising, means for removing gas constituents present in a boundary layer along one of said electrodes which are responsible for initiating arc conditions in said discharge volume, wherein said one of said electrodes is a porous electrode, a source of auxiliary gas, and means for connecting said source of auxiliary gas to said porous electrode means to establish a flow of auxiliary gas through said porous electrode to remove said gas constituents in said boundary layer.

11. A means according to claim 10 wherein said auxiliary gas is selected from the group comprising the noble gases.

12. A means according to claim 10 wherein said auxiliary gas is hydrogen.

13. In a laser system including a laser gas medium flowing through a discharge volume formed by a pair of spaced-apart electrodes, the flowing laser gas medium producing a boundary layer along at least one of said electrodes, and excitation means connected to said electrodes to produce electrical discharges to create a population inversion in said flowing laser gas medium to produce lasing action, the improvement for minimizing arcing conditions in said discharge volume, said improvement comprising, means for removing gas constituents present in a boundary layer along one of said electrodes which are responsible for initiating arc conditions in said discharge volume wherein said one of said electrodes is a porous electrode, a pumping mechanism, and means for connecting said pumping mechanism to said porous electrode to draw said gas constituents through said porous electrode from said boundary layer.

* * * * *